(12) United States Patent
Barnes et al.

(10) Patent No.: US 11,408,400 B2
(45) Date of Patent: Aug. 9, 2022

(54) DE-ICING SYSTEM FOR A WIND TURBINE BLADE

(71) Applicant: LM WIND POWER INTERNATIONAL TECHNOLOGY II APS, Kolding (DK)

(72) Inventors: Helen Rosemary Barnes, Kolding (DK); Laurids Andersen, Kolding (DK)

(73) Assignee: LM WIND POWER INTERNATIONAL TECHNOLOGY II APS, Kolding (DK)

( * ) Notice: Subject to any disclaimer, the term of this patent is extended or adjusted under 35 U.S.C. 154(b) by 0 days.

(21) Appl. No.: 16/972,804

(22) PCT Filed: Jun. 7, 2019

(86) PCT No.: PCT/EP2019/065048
§ 371 (c)(1),
(2) Date: Dec. 7, 2020

(87) PCT Pub. No.: WO2019/234253
PCT Pub. Date: Dec. 12, 2019

(65) Prior Publication Data
US 2021/0246882 A1     Aug. 12, 2021

(30) Foreign Application Priority Data
Jun. 8, 2018 (EP) ..................................... 18176701

(51) Int. Cl.
*F03D 80/40*     (2016.01)
(52) U.S. Cl.
CPC ........ *F03D 80/40* (2016.05); *F05B 2240/221* (2013.01); *F05B 2240/30* (2013.01); *F05B 2260/221* (2013.01); *F05B 2260/222* (2013.01)

(58) Field of Classification Search
None
See application file for complete search history.

(56) References Cited

U.S. PATENT DOCUMENTS

| | | | | |
|---|---|---|---|---|
| 2,510,170 | A * | 6/1950 | Chillson | B64D 15/02 244/134 B |
| 6,702,233 | B1 * | 3/2004 | DuPont | B64D 15/04 244/134 B |

(Continued)

FOREIGN PATENT DOCUMENTS

| | | |
|---|---|---|
| CN | 202673585 U | 1/2013 |
| CN | 105927481 A | 9/2016 |

(Continued)

*Primary Examiner* — Igor Kershteyn
*Assistant Examiner* — Jason Fountain
(74) *Attorney, Agent, or Firm* — Nath, Goldberg & Meyer; Jerald L. Meyer; Tanya E. Harkins

(57) ABSTRACT

Disclosed is a wind turbine blade having a blade de-icing system. The blade de-icing system comprises: a first channel longitudinally extending from a first position to a second position, wherein the second position is between the tip end and the first position; and a heating channel longitudinally extending from the second position to the first position along the leading edge of the wind turbine blade, the heating channel and the first channel being in fluid connection. The blade de-icing system is arranged to provide a flow of heated fluid through the first channel and the heating channel, the flow of heated fluid through the heating channel having a main flow direction along a longitudinal direction of the wind turbine blade, and wherein the blade de-icing system is configured to affect the flow of heated fluid through the heating channel resulting in a rotational flow of the heated fluid about the main flow direction. The rotational flow is rotating from the suction side to the pressure side at the leading edge.

16 Claims, 10 Drawing Sheets

(56) References Cited

U.S. PATENT DOCUMENTS

| | | | |
|---|---|---|---|
| 9,169,830 B2* | 10/2015 | Weitkamp | F03D 1/0683 |
| 10,458,396 B2* | 10/2019 | Philipsen | F03D 80/40 |
| 2004/0041408 A1* | 3/2004 | Casazza | F03D 80/30 |
| | | | 290/55 |
| 2013/0101414 A1* | 4/2013 | Weitkamp | F03D 80/40 |
| | | | 416/1 |
| 2013/0106108 A1 | 5/2013 | DeBoer et al. | |
| 2015/0056074 A1* | 2/2015 | Veldkamp | F01D 17/02 |
| | | | 416/1 |
| 2017/0254316 A1* | 9/2017 | Philipsen | F03D 80/40 |

FOREIGN PATENT DOCUMENTS

| | | | |
|---|---|---|---|
| DE | 102010051293 A1 | 5/2012 | |
| DE | 102010051297 A1 | 5/2012 | |

* cited by examiner

DE-ICING SYSTEM FOR A WIND TURBINE BLADE

This is a National Phase Application filed under 35 U.S.C. 371 as a national stage of PCT/EP2019/065048, filed Jun. 7, 2019, an application claiming the benefit of European Application No. 18176701.3, filed Jun. 8, 2018, the content of each of which is hereby incorporated by reference in its entirety.

The present invention relates to a de-icing system for a wind turbine blade.

BACKGROUND

When wind turbines are operated in cold-weather climates, the potential build-up of ice on the wind turbine blades presents challenges for turbine performance. In a first aspect, any ice formation on the blade surfaces will disrupt the blade aerodynamics, which may lead to a reduction in turbine efficiency and/or increased operational noise levels. In a further aspect, ice which breaks away from blade surfaces can present a falling hazard. In this regard, wind turbine blades in such locations are often provided with systems to deliver ice prevention and/or removal.

In addition to electrical heating systems embedded in blades and mechanical de-icing systems, it is known to provide hot-air de-icing systems which operate on the principle of supplying heated air to the interior of a wind turbine blade, to raise the surface temperature of the blade to above freezing. An example of such a hot-air de-icing system can be seen in US Patent Application Publication No. US 2013/0106108.

It is an object of the invention to provide a de-icing system that provides improved performance over the prior art.

SUMMARY

It is an object of the present disclosure to provide a wind turbine blade with a de-icing system and a method for de-icing of a wind turbine blade, which provides for a more effective de-icing of the wind turbine blade. In particular, the present disclosure provides a more effective heat transfer to the shell of the wind turbine blade, and especially near the leading edge of the wind turbine blade, which may be especially prone to ice-formation.

Accordingly, a wind turbine blade having a blade de-icing system is disclosed. The wind turbine blade comprising a root end and a tip end, a leading edge and a trailing edge, a suction side and a pressure side, and an internal leading edge cavity between the leading edge and a back surface formed by at least one internal shear web or spar side of a spar extending between the suction side and the pressure side.

The blade de-icing system comprises a first channel longitudinally extending from a first position to a second position. The second position being between the tip end and the first position. The blade de-icing system comprises a heating channel longitudinally extending from the second position to the first position along the leading edge of the wind turbine blade. The heating channel and the first channel being in fluid connection.

The blade de-icing system is arranged to provide a flow of heated fluid through the first channel and the heating channel. The flow of heated fluid through the heating channel has a main flow direction along a longitudinal direction of the wind turbine blade. The blade de-icing system is further configured to affect the flow of heated fluid through the heating channel resulting in a rotational flow of the heated fluid about the main flow direction.

Also disclosed is a method for de-icing of a wind turbine blade, such as the disclosed wind turbine blade, comprising a root end and a tip end, a leading edge and a trailing edge, a suction side and a pressure side, and an internal leading edge cavity between the leading edge and a back surface formed by at least one internal shear web or spar side of a spar extending between the suction side and the pressure side. The wind turbine blade further comprising a first channel longitudinally extending from a first position to a second position, wherein the second position is between the tip end and the first position. The wind turbine blade further comprising a heating channel longitudinally extending from the second position to the first position along the leading edge of the wind turbine blade, the heating channel and the first channel being in fluid connection.

The method comprising: providing a flow of heated fluid through the first channel and the heating channel, the flow of heated fluid through the heating channel having a main flow direction along a longitudinal direction of the wind turbine blade; and affecting the flow of heated fluid through the heating channel resulting in a rotational flow of the heated fluid about the main flow direction.

Providing a rotational flow of the heated fluid through the heating channel may result in increased turbulence and increased velocity of the fluid near the internal part of the shell, thereby providing for a more effective heat transfer from the heated fluid to the shell of the wind turbine blade.

The rotational flow may be rotating in either direction. The rotational flow may be rotating from the pressure side to the suction side at the leading edge. The rotational flow may be rotating from the suction side to the pressure side at the leading edge. Ice formation may be more likely on the suction side, e.g. near the leading edge, hence it may be advantageous to direct the rotational flow to rotate from the suction side to the pressure side at the leading edge, such as to allow for an increased heat transfer at the suction side.

The heated fluid employed in the method and the de-icing system may be a gas or a liquid. For example, the heated fluid employed in the method and the de-icing system may be hot air, steam, or a de-icing fluid.

The first channel extends from a first position to a second position. The heating channel extends from the second position to the first position. The first position may be near the root, such as the root end, of the wind turbine blade. The second position may be near the tip, such as the tip end, of the wind turbine blade. The second position is between the tip end and the first position. The first position is between the root end and the second position.

The wind turbine blade, such as the de-icing system of the wind turbine blade may comprise a heating apparatus. The wind turbine blade, such as the de-icing system of the wind turbine blade may comprise a circulation apparatus. The circulation apparatus and the heating apparat may be combined in a heating and circulation apparatus, e.g. the circulation apparatus may comprise a heating apparatus and/or the heating apparatus may comprise a circulation apparatus. The circulation apparatus and/or the heating apparatus may be provided at the first position, such as near the root of the wind turbine blade. Alternatively, a wind turbine may utilise a central heating and/or circulation apparatus, in which case, the heating and/or circulation apparatus may be provided in the hub or nacelle of the wind turbine and connected to the de-icing system of each wind turbine blade as appropriate.

The circulation apparatus may be configured to provide a rotational flow of the heated fluid through the heating channel. For example, the circulation apparatus may be configured to circulate the fluid into the heating channel having a direction near the shell forming an angle with the longitudinal direction of the wind turbine blade. Providing the rotational flow with the circulation apparatus may be particularly useful if the circulation apparatus circulates the fluid directly into the heating channel, e.g. at the first position.

The flow of heated fluid may be provided through the heating channel from the second position to the first position. For example, the blade de-icing system may be arranged to provide the flow of heated fluid through the heating channel from the second position to the first position. The flow of heated fluid may be provided from the first position through the first channel to the second position, and from the second position through the heating channel to the first position. For example, the blade de-icing system may be arranged to provide the flow of heated fluid from the first position through the first channel to the second position, and from the second position through the heating channel to the first position. The flow of heated fluid may be provided from the second position through the heating channel to the first position, and from the first position through the first channel to the second position. For example, the blade de-icing system may be arranged to provide the flow of heated fluid from the second position through the heating channel to the first position, and from the first position through the first channel to the second position.

Alternatively, the flow of heated fluid may be provided through the heating channel from the first position to the second position. For example, the blade de-icing system may be arranged to provide the flow of heated fluid through the heating channel from the first position to the second position. The flow of heated fluid may be provided from the first position through the heating channel to the second position, and from the second position through the first channel to the first position. For example, the blade de-icing system may be arranged to provide the flow of heated fluid from the first position through the heating channel to the second position, and from the second position through the first channel to the first position. The flow of heated fluid may be provided from the second position through the first channel to the first position, and from the first position through the heating channel to the second position. For example, the blade de-icing system may be arranged to provide the flow of heated fluid from the second position through the first channel to the first position, and from the first position through the heating channel to the second position.

The leading edge cavity may form the heating channel. The leading edge cavity may form part of the heating channel, e.g. the heating channel may comprise a plurality of heating channel parts. For example, the heating channel may comprise a first heating channel part between the leading edge cavity and the first position, and/or the heating channel may comprise a second heating channel part between the leading edge cavity and the second position.

The back surface of the leading edge cavity may be formed by a shear web, such as a leading edge shear web. The back surface of the leading edge cavity may be formed by a spar side of a spar, such as a leading edge spar side. The back surface may separate the heating channel and the first channel.

The first channel may be an insulated channel. For example, the first channel may be insulated to avoid, or at least reduce, loss of heat from the fluid inside the first channel, such as to preserve the heat of the fluid for being provided in the heating channel.

The first channel may be arranged outside the leading edge cavity, such as between the back surface of the leading edge cavity and the trailing edge. For example, the first channel may be arranged in a space between two shear webs, such as a leading edge shear web and a trailing edge shear web, or the first channel may be arranged in a space between two spar sides of a spar, such as a leading edge spar side and a trailing edge spar side of a spar.

Alternatively, the first channel may be arranged inside the leading edge cavity. For example, the first channel may be provided as a tube inside the leading edge cavity.

One or more apertures, such as a plurality of apertures, may be provided between the first channel and the heating channel, e.g. to provide for fluid connection between the first channel and the heating channel. The plurality of apertures may be distributed along the longitudinal direction of the wind turbine blade.

The plurality of apertures may be configured to direct the heated fluid into the heating channel in a first direction, e.g. to provide the rotational flow of the heated fluid in the heating channel. The first direction may form a first angle with a second direction between the aperture and the leading edge. The first angle may be more than 10 degrees, such as more than 20 degrees, such as more than 30 degrees, such as more than 40 degrees, such as 45 degrees. The first direction may be towards the suction side. The first direction may be towards the pressure side. The plurality of apertures may comprise a fluid directing element. The fluid directing element may be configured to direct the heated fluid in the first direction. The fluid directing element may be made of foam blocks. The fluid directing element may form a nozzle and a channel to direct the heated fluid. By directing the fluid from the apertures in a direction forming an angle, the heated fluid exiting the apertures is not directed directly into the main flow, and thereby a further advantage may be that it reduces the deflection of the heated fluid from the apertures caused by the main flow. Thus, the temperature of heated fluid reaching the leading edge is higher than if the apertures were directed directly into the main flow. Thereby, the heated fluid from the apertures may provide an increased localised heating of the shell near the apertures.

The plurality of apertures may be positioned at a first aperture distance from the suction side and at a second aperture distance from the pressure side. The first aperture distance and the second aperture distance may be chosen such as to provide the rotational flow of the heated fluid in the heating channel. For example, the second aperture distance may be longer than the first aperture distance, e.g. the second aperture distance may be more than double the first aperture distance. The second aperture distance being longer than the first aperture distance may provide for a rotational flow along the suction side and from the suction side to the pressure side at the leading edge. Alternatively, the first aperture distance may be longer than the second aperture distance, e.g. the second aperture distance may be more than double the first aperture distance. The first aperture distance being longer than the second aperture distance may provide for a rotational flow along the pressure side and from the pressure side to the suction side at the leading edge.

The heating channel may comprise one or more guide structures, such as a plurality of guide structures, e.g. being distributed along the longitudinal direction of the heating channel. The one or more guide structures may be configured to affect the flow of heated fluid through the heating channel resulting in the rotational flow of the heated fluid about the main flow direction. For example, the guide structures may comprise a guide surface with a guide surface normal. The guide surface normal may form a guide angle with the main flow direction. The guide angle may be more than 0 degrees and less than 90 degrees, such as between 20 and 70 degrees, such as between 40 and 50 degrees, such as 45 degrees.

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

DETAILED DESCRIPTION

Figure 1:
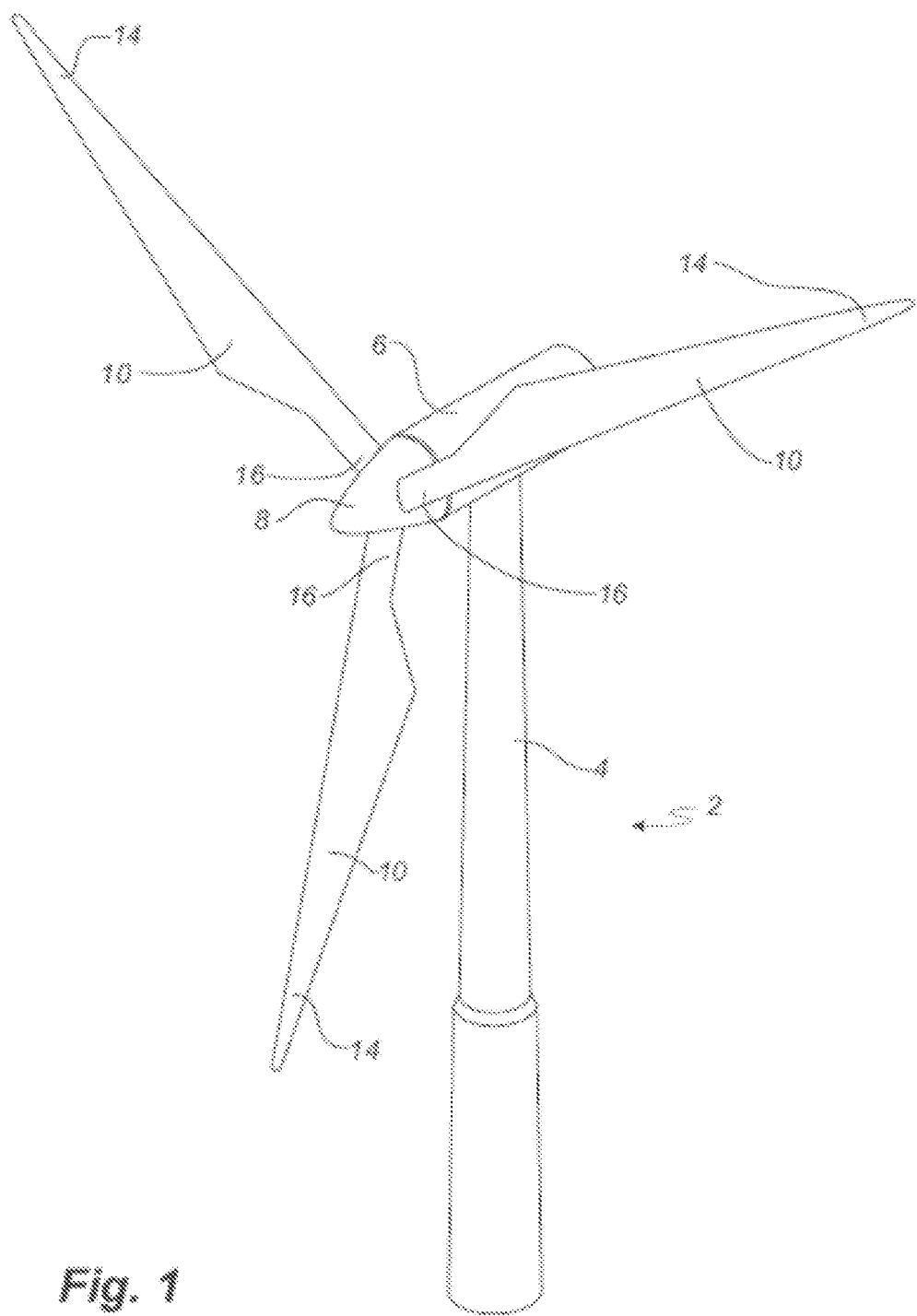
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
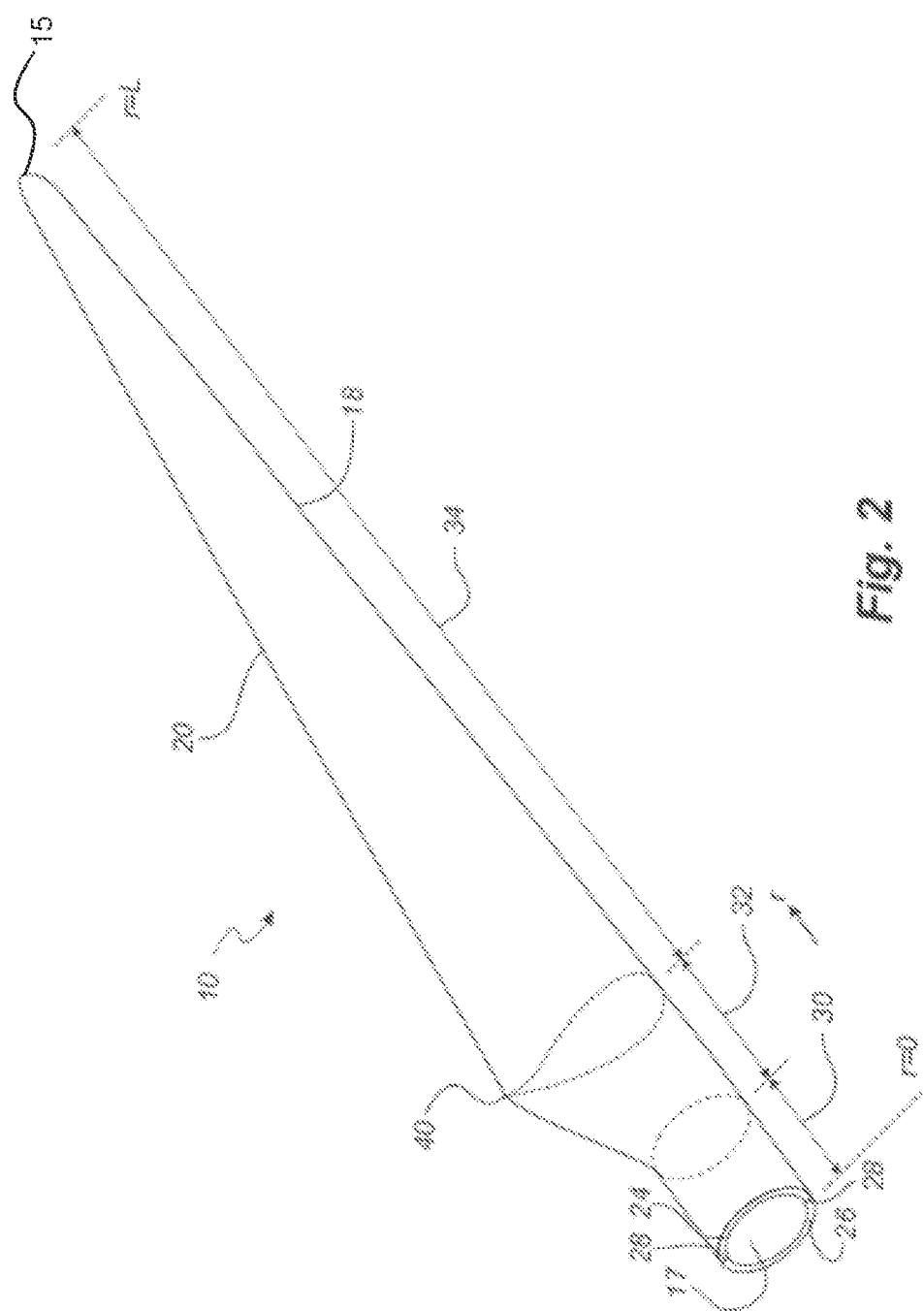
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell. The blade shell may comprise two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part are typically glued together along bond lines or glue joints 28 extending along the trailing edge 20 and the leading edge 18 of the blade 10. Typically, the root ends of the blade shell parts 24, 26 has a semi-circular or semi-oval outer cross-sectional shape.

The wind turbine blade 10 further comprises at least one internal shear web or spar side of a spar (see e.g. FIG. 4a) extending between the suction side and the pressure side of the wind turbine blade 10.

Figure 3:
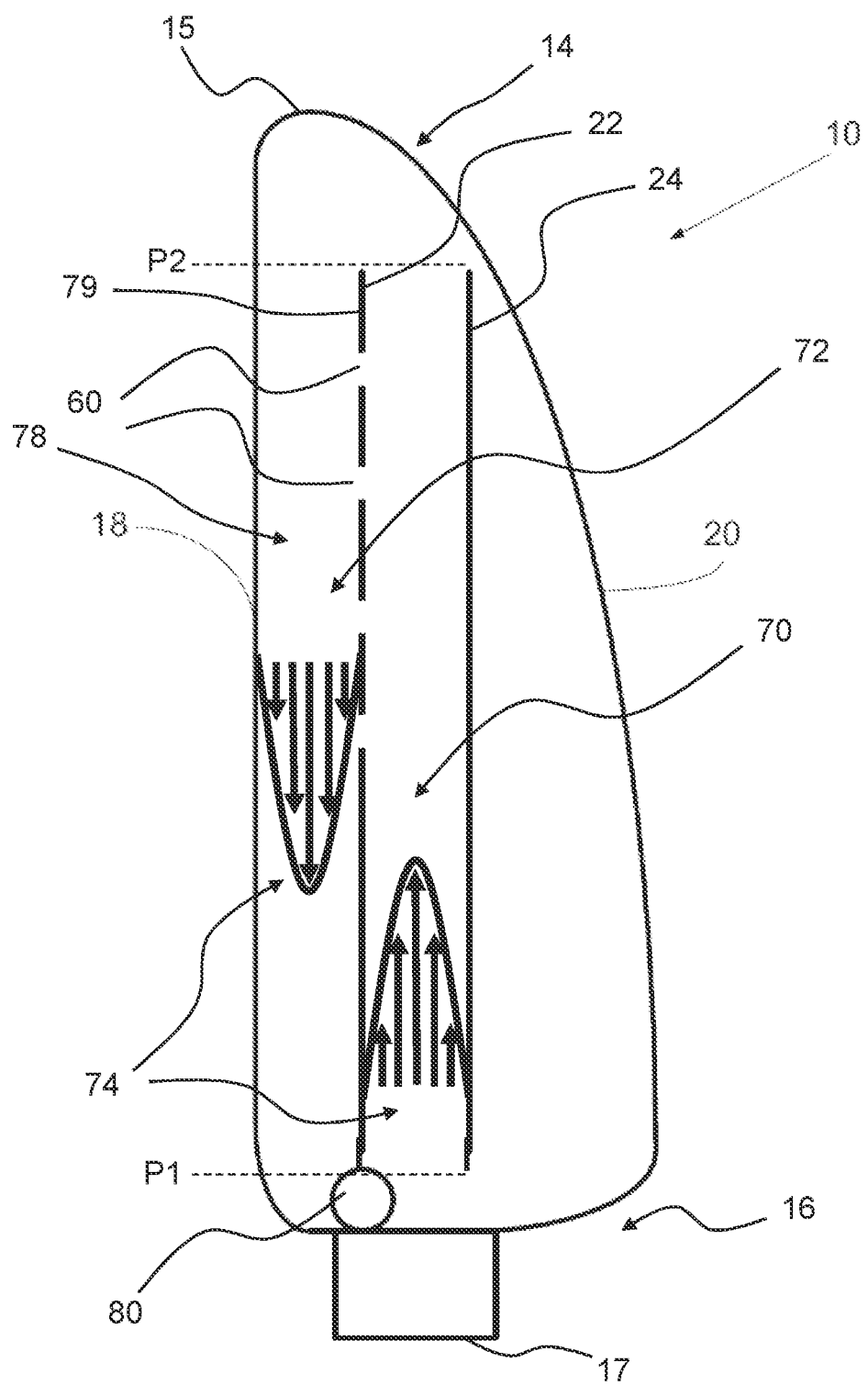
FIG. 3 is a schematic diagram illustrating a longitudinal sectional view of an exemplary wind turbine blade.

FIG. 3 shows a schematically illustrated longitudinal sectional view of an exemplary wind turbine blade 10 with a de-icing system, seen from the suction side 54 to the pressure side 52. The wind turbine blade 10 has a blade tip 14 and a blade root 16. The wind turbine blade 10 has a tip end 15 and a root end 17. The wind turbine blade 10 further comprises two shear webs 22, 24, a leading edge shear web 22 and a trailing edge shear web 24, extending between the suction side and the pressure side of the wind turbine blade 10. Alternatively, the wind turbine blade 10 could comprise a spar, and the spar sides of the spar could replace the illustrated shear webs 22, 24 (see e.g. FIG. 4b). An internal leading edge cavity 78 may be formed between the leading edge 18 and a back surface 79, such as the leading edge shear web 22.

The wind turbine blade 10 comprises a first channel 70 longitudinally extending from a first position P1 to a second position P2. The wind turbine blade 10 comprises a heating channel 72 longitudinally extending from the second position P2 to the first position P1 along the leading edge 18 of the wind turbine blade. The second position is between the tip end 15 and the first position P1. The first position P1 is between the root end 17 and the second position P2. The first position P1 is near the root end 17. The second position P2 is near the tip end 15.

The first channel 70 may be arranged between a leading edge shear web 22 and a trailing edge shear web 24. The heating channel 72 may be arranged in the leading edge cavity 78. The first channel 70 and the heating channel 72 may be in fluid connection, e.g. through apertures 60.

The blade 10 has circulation apparatus 80, such as a heating and circulation apparatus. The circulation apparatus 80 may be located near the root end 17 of the blade.

Alternatively, the circulation apparatus 80 may be located near the tip end 15. The circulation apparatus 80 may be arranged closer to the leading edge 18 than the trailing edge 20. The circulation apparatus 80 may alternatively be arranged closer to the trailing edge 20 than the leading edge 18. Alternatively, the circulation apparatus 80 may be arranged as close to the trailing edge 20 as to the leading edge 18. The circulation apparatus 80 provides flow of heated fluid through the first channel 70 and the heated channel 72. The circulation apparatus 80 may be configured to heat the fluid.

As illustrated, the direction of the flow has a main flow direction 74 which may be directed from the root end 17 to the tip end 15 through the first channel 70, and from the tip end 15 to the root end 17 through the heating channel 72. Alternatively, the main flow direction 74 may be in the opposite direction, i.e. from the blade root end 17 to the blade tip end 15 through the heating channel 72, and from the blade tip end 15 to the blade root end 17 through the first channel 70.

The leading edge shear web 22 comprises a plurality of apertures 60. The plurality of apertures 60 may be distributed along the longitudinal direction of the wind turbine blade 10. The apertures allow flow of the heated fluid between the first channel 70 and the heating channel 72, such as from the first channel 70 to the heating channel 72. The apertures 60 may be configured to affect the flow of heated fluid through the heating channel 72 resulting in a rotational flow of the heated fluid about the main flow direction 74 (see e.g. FIGS. 4a-4c). Alternatively or additionally, the circulation apparatus 80 may be configured to affect the flow of heated fluid through the heating channel 72 resulting in a rotational flow of the heated fluid about the main flow direction 74. Alternatively or additionally, the heating channel 72 may be provided with a plurality of guide structures (see e.g. FIG. 5c) distributed along a longitudinal direction of the heating channel 72.

Figure 4A:
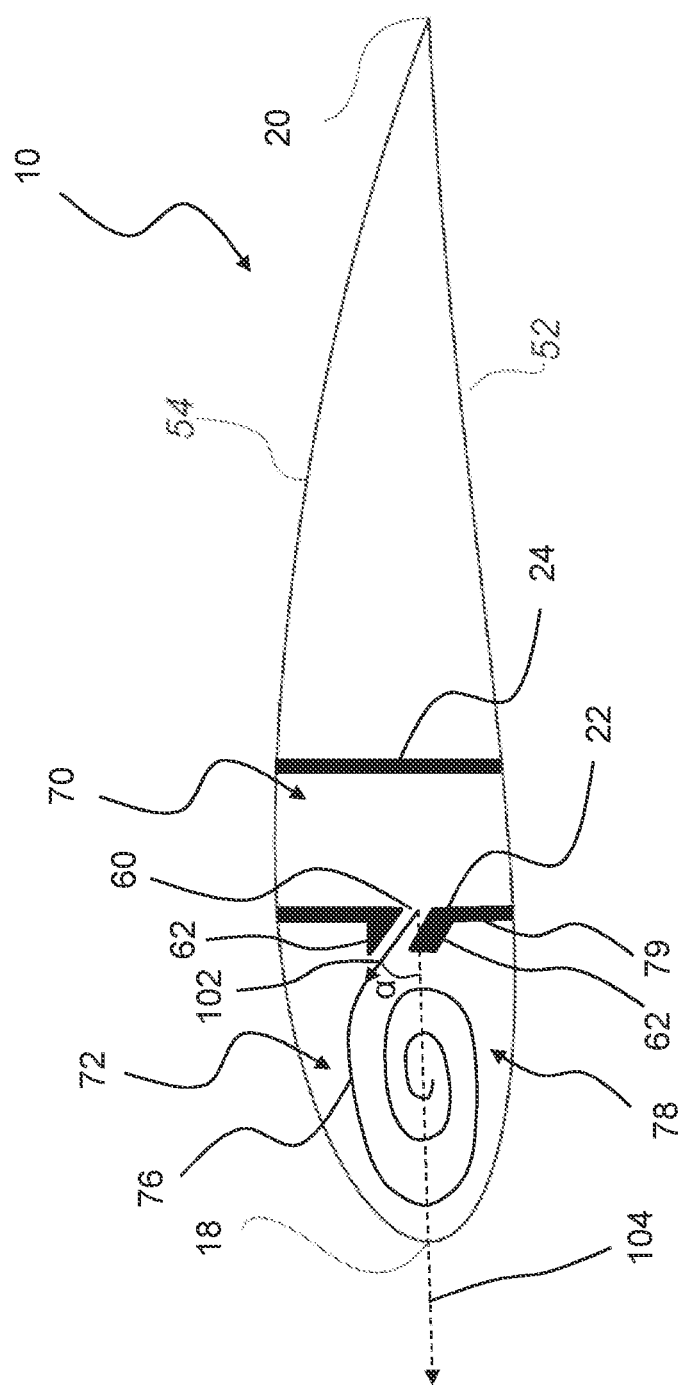
FIG. 4a is a schematic diagram illustrating a cross section of an exemplary wind turbine blade.
Figure 4B:
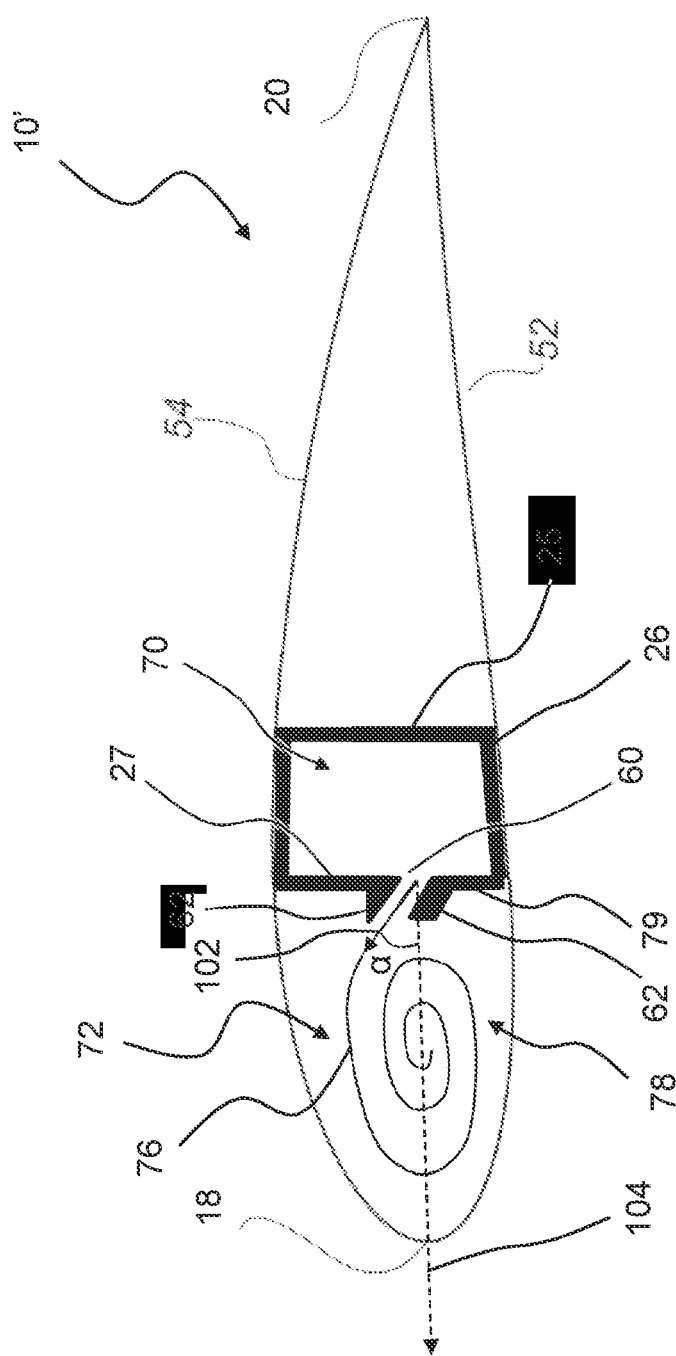
FIG. 4b is a schematic diagram illustrating a cross section of an exemplary wind turbine blade.

FIG. 4a is a schematic diagram illustrating a cross section of a wind turbine blade 10 with a de-icing system, such as the wind turbine blade 10 as illustrated in relation to FIG. 3. The wind turbine blade 10 has a leading edge 18, a trailing edge 20, a pressure side 52 and a suction side 54. The wind turbine blade 10 comprises a leading edge shear web 22 and a trailing edge shear web 24. An alternative to the shear webs 22, 24 may be a spar, as illustrated in FIG. 4b. The de-icing system comprises a first channel 70 and a heating channel 72 defined by the shear webs 22, 24. The heating channel 72 may be, or form part of, an internal leading edge cavity 78 between the leading edge 18 and a back surface 79, such as the leading edge shear web 22.

The leading edge shear web 22 comprises an aperture 60, e.g. of a plurality of apertures. The aperture 60 allows flow of the heated fluid between the first channel 70 and the heating channel 72, such as from the first channel 70 to the heating channel 72, as illustrated. The aperture 60 is configured to affect the flow of heated fluid through the heating channel 72 resulting in a rotational flow 76 of the heated fluid about the main flow direction along the heating channel 72. The rotational flow 76 may be rotating from the suction side 54 to the pressure side 52 at the leading edge 18, as illustrated. Alternatively, the rotational flow 76 may rotate from the pressure side 52 to the suction side 54. As illustrated, the aperture 60 may comprise a fluid directing element 62 to direct the flow of the heated fluid. The direction of the flow may be in a first direction 102 and form an angle α with a second direction 104 between the aperture 60 and the leading edge 18. For example, the angle α may be more than 10 degrees.

FIG. 4b is a schematic diagram illustrating a cross section of a wind turbine blade 10' with a de-icing system, such as the wind turbine blade 10 as illustrated in relation to FIG. 3. The wind turbine blade 10' of FIG. 4b is equivalent to the wind turbine blade 10 of FIG. 4a, except that the wind turbine blade 10' comprises a spar 26 instead of the shear webs of the wind turbine blade 10 of FIG. 4a. The spar 26 comprises a leading edge spar side 23 instead of the leading edge shear web 22 of the wind turbine blade 10 of FIG. 4a, and a trailing edge spar side 25 instead of the trailing edge shear web 24 of the wind turbine blade of FIG. 4a. The leading edge spar side 23 of the spar comprises the aperture 60.

Figure 4C:
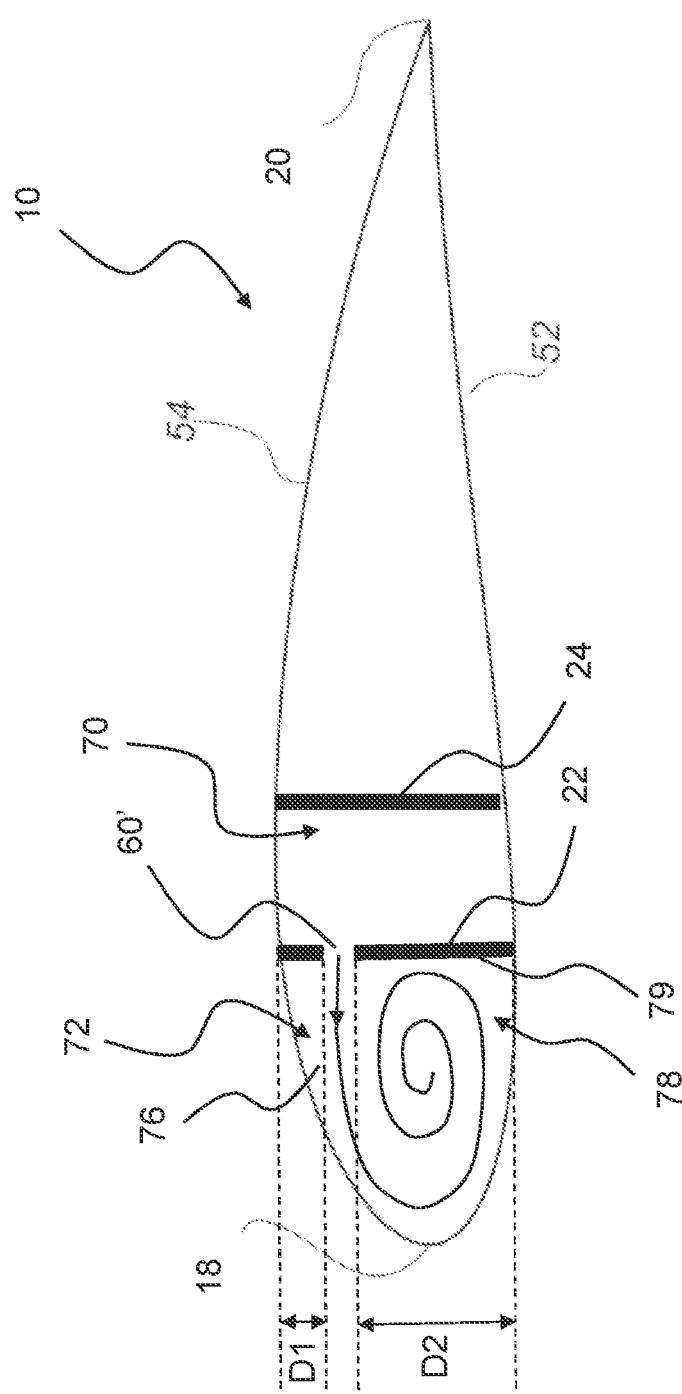
FIG. 4c is a schematic diagram illustrating a cross section of an exemplary wind turbine blade.

FIG. 4c is a schematic diagram illustrating a cross section of a wind turbine blade 10 with a de-icing system, such as the wind turbine blade 10 as illustrated in relation to FIG. 3. The wind turbine blade 10 of FIG. 4c is illustrated having a shear webs 22, 24. However, alternatively, the wind turbine blade 10 may be realised with a spar having spar sides, as explained in relation to FIG. 4b.

The de-icing system may comprise a first channel 70 and a heating channel 72 defined by the shear webs 22, 24. The heating channel 72 may be, or form part of, an internal leading edge cavity 78 between the leading edge 18 and a back surface 79, such as the leading edge shear web 22.

The leading edge shear web 22 comprises an aperture 60', e.g. of a plurality of apertures. The aperture 60' allow flow of the heated fluid between the first channel 70 and the heating channel 72, such as from the first channel 70 to the heating channel 72, as illustrated. The aperture 60' is configured to affect the flow of heated fluid through the heating channel 72 resulting in a rotational flow 76 of the heated fluid about the main flow direction along the heating channel 72. The rotational flow 76 may be rotating from the suction side 54 to the pressure side 52 at the leading edge 18, as illustrated. Alternatively, the rotational flow 76 may rotate from the pressure side 52 to the suction side 54. The aperture 60' is positioned at a first aperture distance D1 from the suction side 54 and at a second aperture distance D2 from the pressure side 52. To affect the flow of fluid through the heating channel 72 resulting in a rotational flow 76 of the heated fluid about the main flow direction 74, the first aperture distance D1 and the second aperture distance may be different. For example, the second aperture distance D2 may be longer than the first aperture distance D1, as illustrated, e.g. resulting in a rotational flow 76 from the suction side 54 to the pressure side 52 at the leading edge 18. Alternatively, the second aperture distance may be shorter than the first aperture distance D1. Thereby, the position of the aperture 60' affects the flow of the heated fluid the heating channel 72 resulting in the rotational flow 76 of the heated fluid about the main flow direction 74.

Figure 5A:
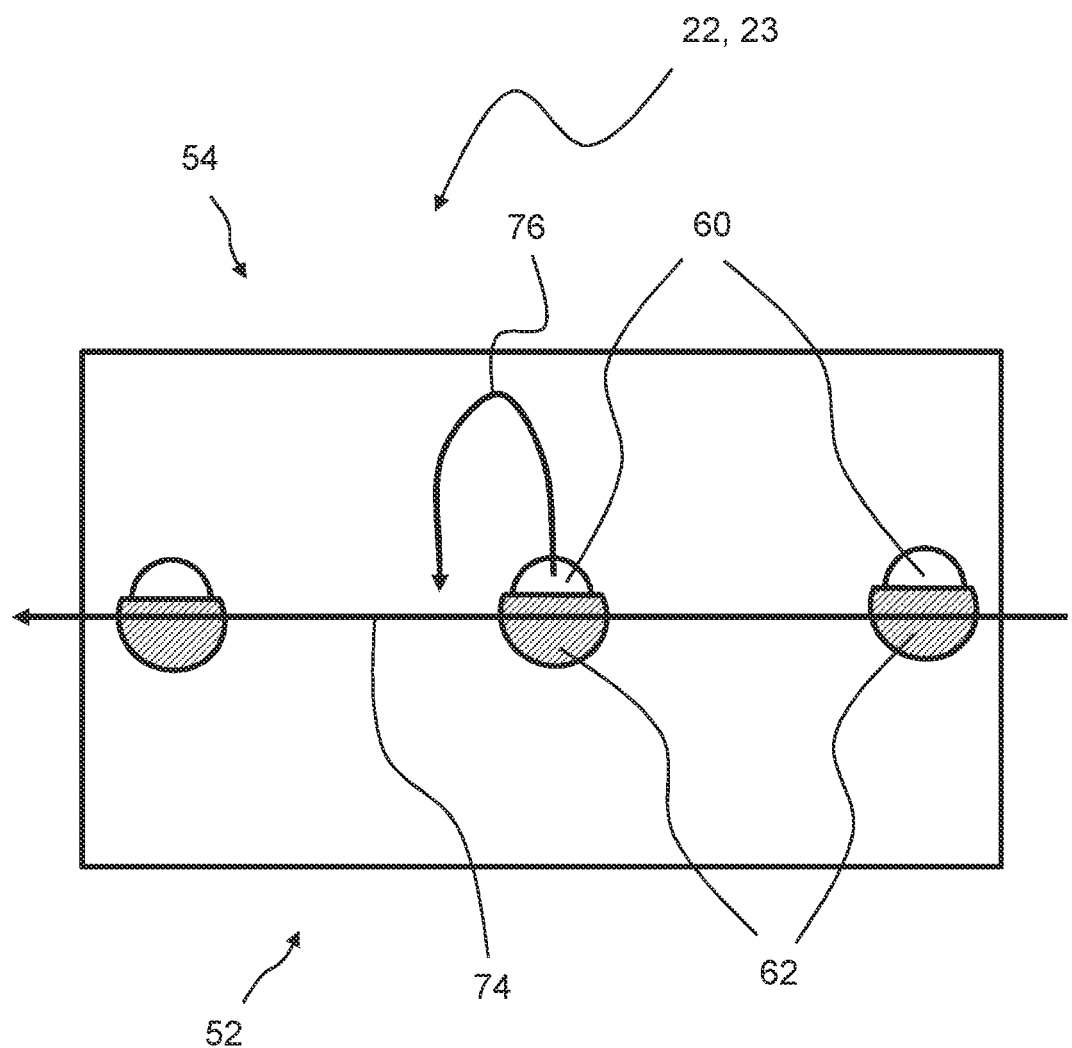
FIG. 5a is a schematic diagram illustrating a longitudinal sectional view of a shear web or spar side of an exemplary wind turbine blade.

FIG. 5a is a schematic diagram illustrating a longitudinal sectional view of an exemplary shear web 22 or a spar side 23, of a wind turbine blade, such as the wind turbine blade as illustrated in relation to FIG. 4a or 4b. The longitudinal sectional view is seen from the leading edge to the trailing edge. The shear web 22 or spar side 23 comprises a plurality of apertures 60 distributed along the longitudinal direction of the wind turbine blade. The aperture 60 comprises a fluid directing element 62 to direct heated fluid from the first channel 70 into the heating channel 72. The apertures 60 are configured to direct the heated fluid into the heating channel 72 in a first direction forming a first angle (not shown) with a second direction between the aperture 60 and the leading edge 18. Thereby, the heated fluid may flow in a rotational flow 76 about a main flow direction 74, and may rotate from the suction side 54 to the pressure side 52 at the leading edge 18.

Figure 5B:
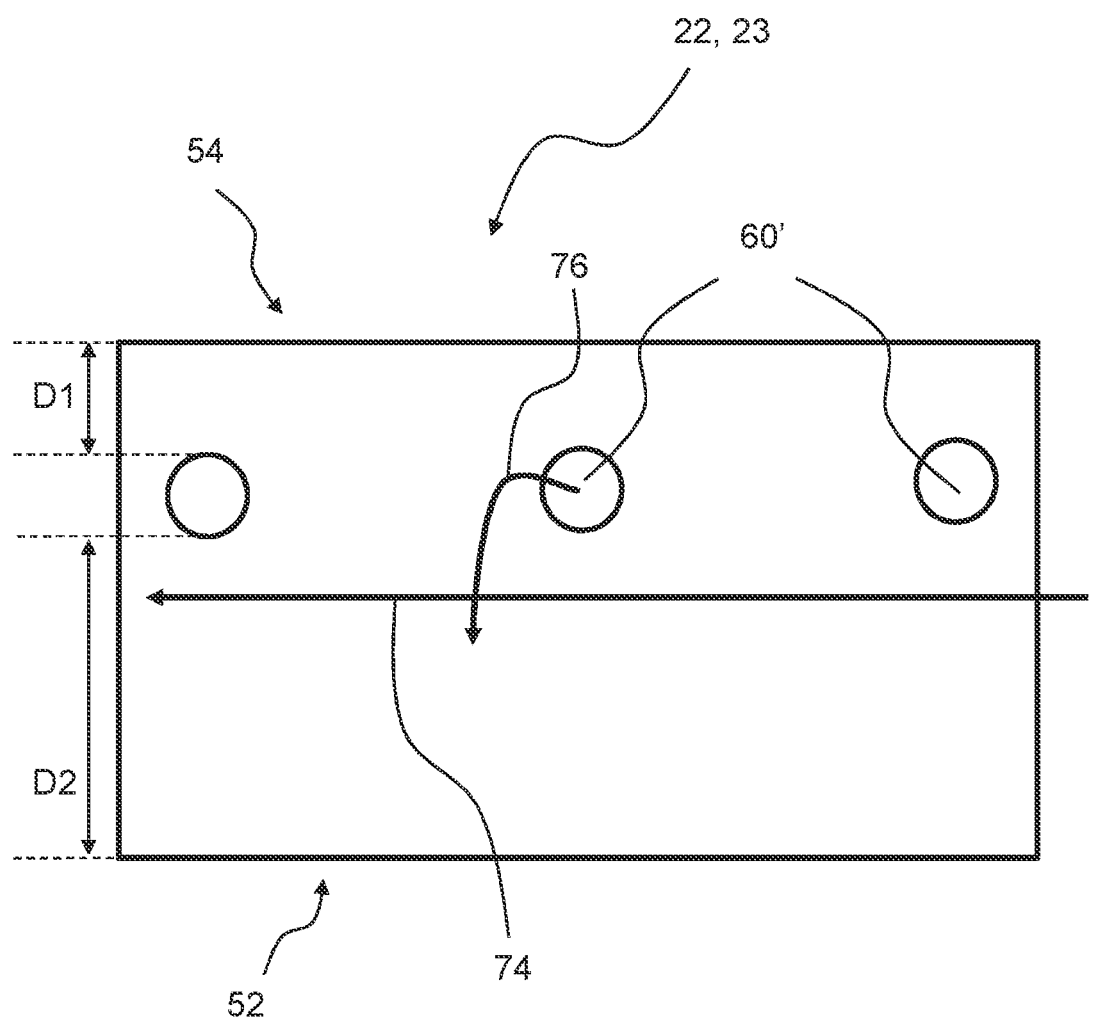
FIG. 5b is a schematic diagram illustrating a longitudinal sectional view of a shear web or spar side of an exemplary wind turbine blade.

FIG. 5b is a schematic diagram illustrating longitudinal sectional view of an exemplary shear web 22 or a spar side 23, of a wind turbine blade, such as the wind turbine blade as illustrated in relation to FIG. 4c. The longitudinal sectional view is seen from the leading edge to the trailing edge. The shear web 22 or spar side 23 may comprise a plurality of apertures 60' distributed along the longitudinal direction of the wind turbine blade. The apertures 60' are positioned at a first aperture distance D1 from the suction side 54 and at a second aperture distance D2 from the pressure side 52. To affect the flow of fluid through the heating channel 72 resulting in a rotational flow 76 of the heated fluid about the main flow direction 74, the first aperture distance D1 and the second aperture distance are different. For example, the second aperture distance D2 may be longer than the first aperture distance D1, as illustrated, e.g. resulting in a rotational flow 76 from the suction side 54 to the pressure side 52 at the leading edge, and from the pressure side to the suction side 54 at the back surface of the heating channel 72, e.g. the shear web 22 or spar side 23. Alternatively, the second aperture distance may be shorter than the first aperture distance D1, which would provide an opposite rotational flow. Thereby, the position of the apertures 60' affects the flow of the heated fluid the heating channel 72 resulting in the rotational flow 76 of the heated fluid about the main flow direction 74.

Figure 5C:
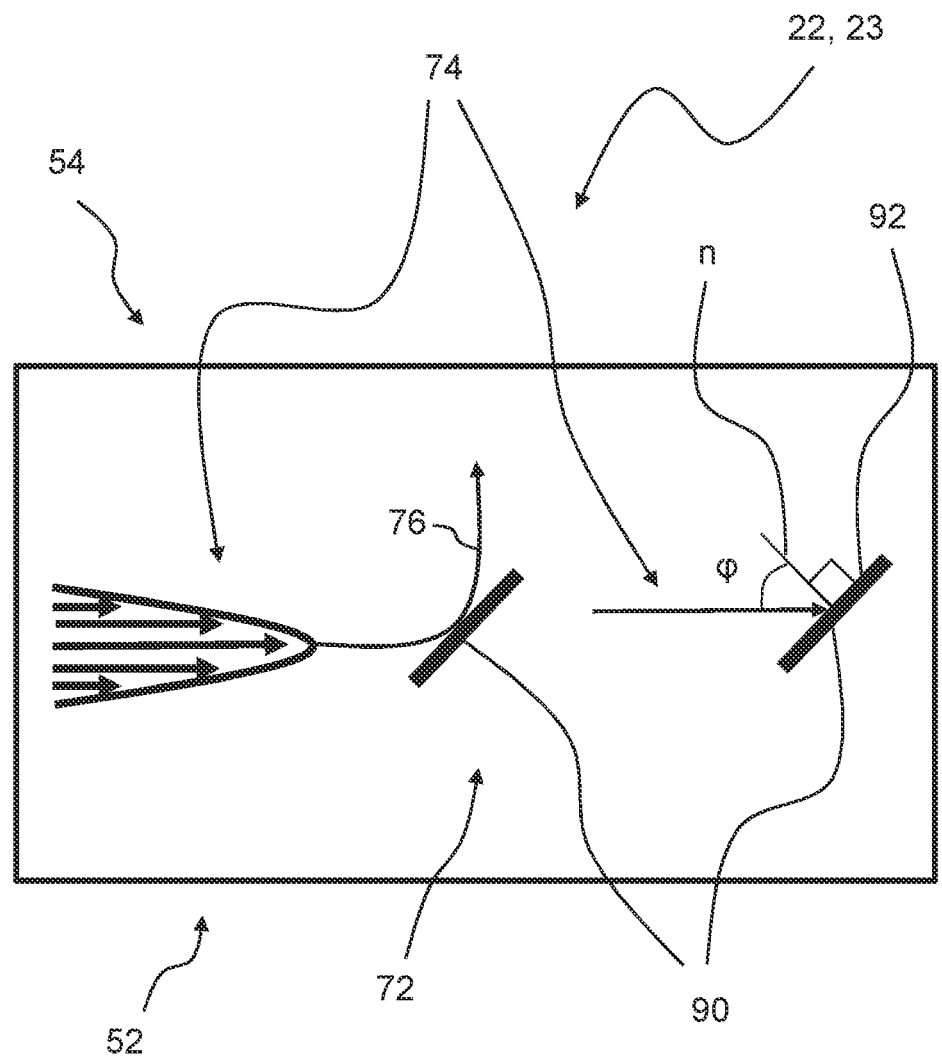
FIG. 5c is a schematic diagram illustrating a longitudinal sectional view of a shear web or spar side of an exemplary wind turbine blade.

FIG. 5c is a schematic diagram illustrating longitudinal sectional view of an exemplary shear web 22 or a spar side 23, of a wind turbine blade. The longitudinal sectional view is seen from the leading edge to the trailing edge. The shear web 22 or spar side 23 may comprise a plurality of guide structures 90 distributed along a longitudinal direction of the shear web 22 or spar side 23, such along a longitudinal direction of the heating channel 72. The guide structures 90 may be configured to affect the flow of the heated fluid through the heating channel 72 resulting in a rotational flow 76 of the heated fluid about a main flow direction 74. The guide structures may be configured such that the rotational flow 76 may rotate from the suction side 54 to the pressure side 52 at the leading edge, and from the pressure side to the suction side 54 at the back surface of the heating channel 72, e.g. the shear web 22 or spar side 23. The guide structure 90 comprises a guide surface 92. The guide surface normal n forms a guide surface angle φ with the main flow direction 74. The guide surface angle φ may be more than 0 degrees and less than 90 degrees, e.g. the guide surface angle φ may be 45 degrees.

Figure 6:
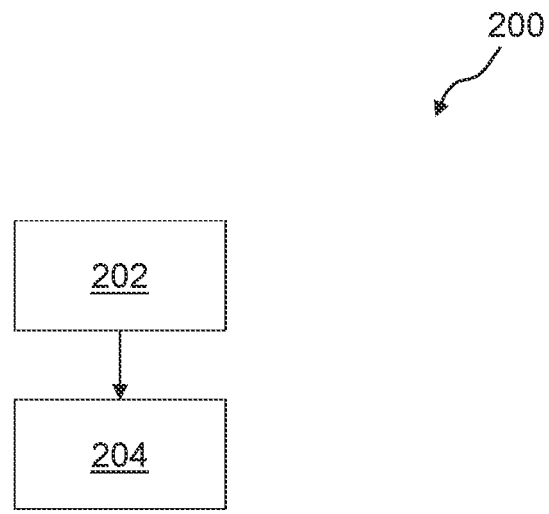
FIG. 6 is a flow diagram of an exemplary method.

FIG. 6 shows a flow diagram of an exemplary method 200, for de-icing of a wind turbine blade, such as the wind turbine blade of any of the previous figures, e.g. FIG. 2. The method 200 comprises providing a flow of heated fluid 202 through the first channel and the heating channel having a main flow direction along a longitudinal direction of the wind turbine blade. For example, the heated fluid may be provided by a heating and circulation apparatus. The method 200 further comprises affecting 204 the flow of heated fluid through the heating channel resulting in a rotational flow of the heated fluid about the main flow direction. For example, the main flow may be affected by providing one or more apertures with fluid directing element (see e.g. FIG. 4a, 4b, or 5a), shifting the one or more apertures towards the pressure side or suction side (see e.g. FIG. 4c or 5b), or providing one or more guide structures (see e.g. 5c).

It will be understood that the above examples are not mutually exclusive and may be combined. Individual features of the above embodiments may be combined with those features of any other embodiments. For example, the examples described above for affecting the flow of heated fluid through the heating channel resulting in a rotational flow of the heated fluid about the main flow direction, may be combined.

For example, a wind turbine blade may be realised having fluid directing elements 62 as explained in relation to FIGS. 4a, 4b and 5a in combination with apertures being offset as explained in relation to FIGS. 4c and 5b and/or in combination with guide structures 90 as explained in relation to FIG. 5c.

A wind turbine blade having a de-icing system as described delivers several advantages over the prior art. The invention provides a more efficient and effective de-icing system, which results in reduced stresses and strains and weight requirements for the overall wind turbine blade structure.

It will be understood that elements common to the different embodiments of the invention have been provided with the same reference numerals in the drawings. It will be further understood that individual features shown in the different embodiments of the invention are not limited to those specific embodiments only, and may be reproduced appropriately in any of the other shown embodiments.

The invention has been described with reference to preferred embodiments. However, the scope of the invention is not limited to the illustrated embodiments, and alterations and modifications can be carried out without deviating from the scope of the invention.

Exemplary wind turbine blades and methods are set out in the following items:

1. A wind turbine blade having a blade de-icing system, the wind turbine blade comprising a root end and a tip end, a leading edge and a trailing edge, a suction side and a pressure side, and an internal leading edge cavity between the leading edge and a back surface formed by at least one internal shear web or spar side of a spar extending between the suction side and the pressure side, the blade de-icing system comprises:

a first channel longitudinally extending from a first position to a second position, wherein the second position is between the tip end and the first position; and a heating channel longitudinally extending from the second position to the first position along the leading edge of the wind turbine blade, the heating channel and the first channel being in fluid connection;

wherein the blade de-icing system is arranged to provide a flow of heated fluid through the first channel and the heating channel, the flow of heated fluid through the heating channel having a main flow direction along a longitudinal direction of the wind turbine blade, and wherein the blade de-icing system is configured to affect the flow of heated fluid through the heating channel resulting in a rotational flow of the heated fluid about the main flow direction.

2. Wind turbine blade according to item 1 comprising a heating apparatus and/or a circulation apparatus provided at the first position.

3. Wind turbine blade according to any of the preceding items, wherein the blade de-icing system is arranged to provide the flow of heated fluid from the first position through the first channel to the second position, and from the second position through the heating channel to the first position.

4. Wind turbine blade according to any of the preceding items, and wherein the leading edge cavity forms the heating channel.

5. Wind turbine blade according to any of the preceding items, wherein the back surface separates the heating channel and the first channel.

6. Wind turbine blade according to any of the preceding items, wherein the first channel is arranged in a space between a leading edge shear web or a leading edge spar side of a spar, and a trailing edge shear web or a trailing edge spar side of a spar.

7. Wind turbine blade according to any of items 1-4, wherein first channel is arranged inside the leading edge cavity.

8. Wind turbine blade according to any of the preceding items, wherein the rotational flow is rotating from the suction side to the pressure side at the leading edge.

9. Wind turbine blade according to any of the preceding items comprising a plurality of apertures between the first channel and the heating channel, the plurality of apertures being distributed along the longitudinal direction of the wind turbine blade.

10. Wind turbine blade according to item 9, wherein the plurality of apertures is configured to direct the heated fluid into the heating channel in a first direction, the first direction forming a first angle with a second direction between the aperture and the leading edge.

11. Wind turbine blade according to item 10, wherein the first angle is more than 10 degrees.

12. Wind turbine blade according to any of items 9-11, wherein the plurality of apertures comprises a fluid directing element to direct the heated fluid in the first direction.

13. Wind turbine blade according to any of items 9-12 wherein the plurality of apertures is positioned at a first aperture distance from the suction side and at a second aperture distance from the pressure side, and wherein the second aperture distance is longer than the first aperture distance.

14. Wind turbine blade according to item 13 wherein the second aperture distance is more than double the first aperture distance.

15. Wind turbine blade according to any of the preceding items, wherein the heating channel comprises a plurality of guide structures being distributed along the longitudinal direction of the heating channel, the plurality of guide structures being configured to affect the flow of heated fluid through the heating channel resulting in the rotational flow of the heated fluid about the main flow direction.

16. Wind turbine blade according to item 15, wherein the guide structures comprises a guide surface with a guide surface normal forming a guide angle with the main flow direction, the guide angle being more than 0 degrees and less than 90 degrees.

17. Method for de-icing of a wind turbine blade comprising a root end and a tip end, a leading edge and a trailing edge, a suction side and a pressure side, and an internal leading edge cavity between the leading edge and a back surface formed by at least one internal shear web or spar side of a spar extending between the suction side and the pressure side, the wind turbine blade further comprising a first channel longitudinally extending from a first position to a second position, wherein the second position is between the tip end and the first position, and the wind turbine blade further comprising a heating channel longitudinally extending from the second position to the first position along the leading edge of the wind turbine blade, the heating channel and the first channel being in fluid connection, the method comprising:
providing a flow of heated fluid through the first channel and the heating channel, the flow of heated fluid through the heating channel having a main flow direction along a longitudinal direction of the wind turbine blade, and
affecting the flow of heated fluid through the heating channel resulting in a rotational flow of the heated fluid about the main flow direction.

LIST OF REFERENCES 10 blade
14 blade tip
15 tip end
16 blade root
17 root end
18 leading edge
20 trailing edge
22 leading edge shear web
23 leading edge spar side
24 trailing edge shear web
25 trailing edge spar side
26 spar
52 pressure side
54 suction side
60 apertures
62 fluid directing element
α first angle
70 first channel
72 heating channel
74 main flow direction
76 rotational flow
78 leading edge cavity
79 back surface
80 heating and circulation apparatus
90 guide structure
92 guide surface
n guide surface normal
φ guide angle
D1 first aperture distance
D2 second aperture distance
P1 first position
P2 second position

The invention claimed is:

1. A wind turbine blade having a blade de-icing system, the wind turbine blade comprising a root end and a tip end, a leading edge and a trailing edge, a suction side and a pressure side, and an internal leading edge cavity between the leading edge and a back surface formed by at least one internal shear web or spar side of a spar extending between the suction side and the pressure side, the blade de-icing system comprising:
a first channel longitudinally extending from a first position to a second position, wherein the second position is between the tip end and the first position; and
a heating channel longitudinally extending from the second position to the first position along the leading edge of the wind turbine blade, the heating channel and the first channel being in fluid connection,
wherein the blade de-icing system is arranged to provide a flow of heated fluid through the first channel and the heating channel, the flow of heated fluid through the heating channel having a main flow direction along a longitudinal direction of the wind turbine blade, and wherein the blade de-icing system is configured to affect the flow of heated fluid through the heating channel resulting in a rotational flow of the heated fluid about the main flow direction, and wherein the rotational flow is rotating from the suction side to the pressure side at the leading edge or rotating from the pressure side to the suction side at the leading edge.

2. The wind turbine blade according to claim 1 comprising a heating apparatus and/or a circulation apparatus provided at the first position.

3. The wind turbine blade according to claim 1, wherein the blade de-icing system is arranged to provide the flow of heated fluid from the first position through the first channel to the second position, and from the second position through the heating channel to the first position.

4. The wind turbine blade according to claim 1, and wherein the leading edge cavity forms the heating channel.

5. The wind turbine blade according to claim 1, wherein the back surface separates the heating channel and the first channel.

6. The wind turbine blade according to claim 1, wherein the first channel is arranged in a space between a leading edge shear web or a leading edge spar side of a spar, and a trailing edge shear web or a trailing edge spar side of a spar.

7. The wind turbine blade according to claim 1, wherein first channel is arranged inside the leading edge cavity.

8. The wind turbine blade according to claim 1 comprising a plurality of apertures between the first channel and the heating channel, the plurality of apertures being distributed along the longitudinal direction of the wind turbine blade.

9. The wind turbine blade according to claim 8, wherein the plurality of apertures is configured to direct the heated fluid into the heating channel in a first direction, the first direction forming a first angle with a second direction between the aperture and the leading edge.

10. The wind turbine blade according to claim 9, wherein the first angle is more than 10 degrees.

11. The wind turbine blade according to claim 8, wherein the plurality of apertures comprises a fluid directing element to direct the heated fluid in the first direction.

12. The wind turbine blade according to claim 8, wherein the plurality of apertures is positioned at a first aperture distance from the suction side and at a second aperture distance from the pressure side, and wherein the second aperture distance is longer than the first aperture distance.

13. The wind turbine blade according to claim 12 wherein the second aperture distance is more than double the first aperture distance.

14. The wind turbine blade according to claim 1, wherein the heating channel comprises a plurality of guide structures being distributed along the longitudinal direction of the heating channel, the plurality of guide structures being configured to affect the flow of heated fluid through the heating channel resulting in the rotational flow of the heated fluid about the main flow direction.

15. The wind turbine blade according to claim 14, wherein the guide structures comprises a guide surface with a guide surface normal forming a guide angle with the main flow direction, the guide angle being more than 0 degrees and less than 90 degrees.

16. A method for de-icing of a wind turbine blade comprising a root end and a tip end, a leading edge and a trailing edge, a suction side and a pressure side, and an internal leading edge cavity between the leading edge and a back surface formed by at least one internal shear web or spar side of a spar extending between the suction side and the pressure side, the wind turbine blade further comprising a first channel longitudinally extending from a first position to a second position, wherein the second position is between the tip end and the first position, and the wind turbine blade further comprising a heating channel longitudinally extending from the second position to the first position along the leading edge of the wind turbine blade, the heating channel and the first channel being in fluid connection, the method comprising:

providing a flow of heated fluid through the first channel and the heating channel, the flow of heated fluid through the heating channel having a main flow direction along a longitudinal direction of the wind turbine blade; and affecting the flow of heated fluid through the heating channel resulting in a rotational flow of the heated fluid about the main flow direction.

* * * * *